(12) United States Patent
Williams et al.

(10) Patent No.: US 8,969,262 B2
(45) Date of Patent: *Mar. 3, 2015

(54) UTILIZATION OF AN ANHYDRIDE AS A DEMULSIFIER AND A SOLVENT FOR DEMULSIFIER FORMULATIONS

(75) Inventors: Duncan E. Williams, Calgary (CA); Richard Mgla, Calgary (CA)

(73) Assignee: Nalco Company, Naperville, IL (US)

( * ) Notice: Subject to any disclaimer, the term of this patent is extended or adjusted under 35 U.S.C. 154(b) by 721 days.

This patent is subject to a terminal disclaimer.

(21) Appl. No.: 12/132,842

(22) Filed: Jun. 4, 2008

(65) Prior Publication Data

US 2009/0305925 A1 Dec. 10, 2009

(51) Int. Cl.
| | | |
|---|---|---|
| C09K 8/58 | (2006.01) | |
| B01D 17/05 | (2006.01) | |
| B01D 17/04 | (2006.01) | |
| C10G 33/04 | (2006.01) | |
| B01D 17/00 | (2006.01) | |

(52) U.S. Cl.
CPC .............. B01D 17/047 (2013.01); C10G 33/04 (2013.01); *Y10S 507/935* (2013.01); *Y10S 507/936* (2013.01)
USPC ........... 507/220; 507/236; 507/244; 507/245; 507/246; 507/935; 507/936; 166/305.1

(58) Field of Classification Search
USPC .................. 516/135, 139, 160; 208/187, 188; 204/567, 570, 573, 514; 210/708; 507/220, 221, 222, 223, 224, 225, 226, 507/227, 228, 229, 230, 231, 244, 245, 246, 507/935, 936; 166/272.3, 272.6, 272.7, 166/305.1
See application file for complete search history.

(56) References Cited

U.S. PATENT DOCUMENTS

| | | | | |
|---|---|---|---|---|
| 1,596,589 | A | | 8/1926 | De Groote |
| 1,659,996 | A | | 2/1928 | De Groote et al. |
| 1,996,090 | A | * | 4/1935 | Willson ........................ 521/84.1 |
| 2,023,982 | A | * | 12/1935 | Stehr ............... 516/174 |
| 2,083,223 | A | * | 6/1937 | De Groote ................ 516/153 |
| 2,251,393 | A | * | 8/1941 | Blair, Jr. ..................... 507/244 |
| 2,499,370 | A | | 3/1950 | De Groote et al. |
| 2,557,081 | A | | 6/1951 | De Groote et al. |
| 2,602,053 | A | | 7/1952 | De Groote et al. |
| 2,654,714 | A | * | 10/1953 | Kirkpatrick ................... 516/158 |
| 2,863,832 | A | * | 12/1958 | Perrine ........................ 507/267 |
| 3,441,085 | A | * | 4/1969 | Gidley .......................... 166/307 |
| 3,452,818 | A | * | 7/1969 | Gidley et al. ............... 166/308.2 |
| 3,640,894 | A | | 2/1972 | Sampson |
| 3,684,735 | A | | 8/1972 | Oppenlaender et al. |
| 3,873,452 | A | * | 3/1975 | Donham ........................ 507/240 |
| 3,987,211 | A | * | 10/1976 | Dunn et al. .................... 426/551 |
| 4,098,692 | A | | 7/1978 | Baker et al. |
| 4,190,615 | A | * | 2/1980 | Becker .......................... 558/155 |
| 4,537,701 | A | | 8/1985 | Oppenlaender et al. |
| 5,176,847 | A | * | 1/1993 | Kremer .......................... 516/177 |
| 5,753,598 | A | | 5/1998 | Briffett |
| 5,759,409 | A | * | 6/1998 | Knauf et al. ................... 210/708 |
| 5,888,944 | A | * | 3/1999 | Patel ............................ 166/300 |
| 2003/0182848 | A1 | | 10/2003 | Collier et al. |
| 2005/0037928 | A1 | * | 2/2005 | Qu et al. ........................ 507/100 |
| 2005/0288380 | A1 | | 12/2005 | MacPherson et al. |
| 2007/0062849 | A1 | * | 3/2007 | Luo et al. .................. 208/251 R |
| 2007/0203219 | A1 | * | 8/2007 | Hajko et al. .................... 514/412 |
| 2009/0306232 | A1 | * | 12/2009 | Williams ....................... 516/140 |
| 2014/0238901 | A1 | * | 8/2014 | Flores Oropeza et al. .... 208/188 |

FOREIGN PATENT DOCUMENTS

| | | |
|---|---|---|
| GB | 834 767 | 5/1960 |
| GB | 2 118 937 | 11/1983 |
| WO | 96/00766 | 1/1996 |

OTHER PUBLICATIONS

MSDS, Acetic Anhydride, Mallinkrodt Baker Inc., J.T.Baker, Phillipsburg, N.J., (effective date Aug. 18, 2005), obtained online @ http://chem.uaa.alaska.edu/files/MSDS/Chem104L/Experiment%2030/Acetic%20Anhydride.pdf, (downloaded Sep. 9, 2010), pp. 1-7.*
Rudolf Heusch, "Emulsions", Ullmann's Encyclopedia of Industrial Chemistry, pp. 457 and 472, Published Online: Jun. 15, 2000, DOI: 10.1002/14356007.a09_297, obtained online @ http://onlinelibrary.wiley.com/doi/10.1002/14356007.a09_297/pdf (Downloaded Aug. 28, 2012).*
Baker, Mallinkrodt, MSDS, Acetic Ahnydride, safety data sheet, published Aug. 8, 2005, revised Jun. 3, 2014.

* cited by examiner

*Primary Examiner* — Daniel S Metzmaier
(74) *Attorney, Agent, or Firm* — Edward O. Yonter

(57) ABSTRACT

The present invention includes the use of anhydride compositions, including alkyl and aryl anhydrides, for use as a demulsifier in resolving emulsions of water and oil. In particular, the anhydride composition can be used alone or in a blend with other demulsifiers. Suitable anhydrides suitable for the present invention include acetic and propionic, with acetic anhydride being preferred. The anhydride composition can be added directly to crude oil or other compositions to be resolved. As such, the demulsifier composition includes an anhydride, such as acetic anhydride, alone or in combination with other demulsifiers. The anhydride can be used in an amount ranging between trace and 100% by weight of the demulsifier composition.

4 Claims, No Drawings

UTILIZATION OF AN ANHYDRIDE AS A DEMULSIFIER AND A SOLVENT FOR DEMULSIFIER FORMULATIONS

TECHNICAL FIELD

This invention relates to demulsifier compositions and methods for resolving water-in-oil emulsions. More particularly, this invention relates to anhydride compositions, such as acetic anhydride, for use as a demulsifier or as a component in demulsifier compositions for use in resolving water-in-oil emulsions. This invention has particular applicability in cold climates where low temperature stability is required.

BACKGROUND

Crude oil produced from geological formations can contain various amounts of water. Water and crude oil are naturally non-miscible; however, when naturally occurring interfacial active compounds are present, these compounds can aggregate on the oil and water interface and cause water to form droplets within the bulk oil phase. During crude oil lifting through production tubings, the oil and water encounters an increased mixing energy from rapid flow through chokes and bends. This additional mixing energy can emulsify the oil and water. Such an oil external, water internal two-phase system is commonly referred to as a crude oil emulsion, which can be quite stable. The presence of water in crude oil, however, can interfere with refining operations, induce corrosion, increase heat capacity, and result in reduced handling capacity of pipelines and refining equipment. Therefore, the crude oil that is to be shipped out of the oilfield should be practically free of water and usually has a maximum water content limit of about 0.5 to 3% by total weight, depending on the type of crude and oil company.

The emulsified water can also contain various amounts of salts. These salts are detrimental to crude oil refining processes due to potential corrosion in the refinery. In crude oil refining, desalting techniques comprise the deliberate mixing of the incoming crude oil with a fresh "wash water" to extract the water soluble salts and hydrophilic solids from the crude oil. Primary dehydration of the crude oil occurs in oil field water oil separation systems such as "free water knock out" and "Phase separators." Quite often, these systems are not adequate for efficient separation due to factors such as over production, unexpected production changes, and system underdesigns. In these cases, emulsion-breaking chemicals are added to the production processes to assist and promote rapid water oil separations.

Commonly used emulsion-breaking chemicals or demulsifiers include alkylphenol formaldehyde resin alkoxylates (AFRA), polyalkylene glycols (PAG), organic sulfonates, and the like. These compounds, however, may not provide satisfactory performance in all instances. In particular, in extremely cold weather (e.g., −40° C. and below) various problems are known. These active ingredients are typically viscous and require a suitable solvent to reduce the viscosity of the demulsifier blend. Accordingly, there is an ongoing need for new, economical and effective chemicals and processes for resolving emulsions into the component parts of oil and water or brine, including processes and compositions that are suitable for cold climates.

Finally, organic acids are commonly used in demulsifier formulations to enhance performance. Organic acids (and occasionally inorganic acids) are sometimes used as separate or supplementary treatments to conventional demulsifier formulations. Such acids or formulations containing acids require solvents to stabilize the blend, especially in cold climate conditions where freezing is an issue and pour points of less than −40° C. are required. Inactive solvents comprise large proportions of the total volume of a demulsifier blend, especially when the blend is used in cold climates. The purpose of such solvent is primarily viscosity reduction to allow handling and prevent freezing. The problem is that such blends contain significant amounts of solvent.

For this reason it is desired to have a demulsifier blend that contains a comparatively smaller amount of solvent. It is also desired to have a demulsifier composition that is 100% active and comparatively inexpensive.

SUMMARY

The present invention includes the use of anhydride compositions, including, for example, alkyl and aryl anhydrides, for use as a demulsifier in resolving water-in-oil emulsions. In particular, the anhydride composition can be used alone or in a blend with other demulsifiers. Specific anhydrides suitable for use in the present invention include acetic and propionic, with the preferred being acetic anhydride. The anhydride composition can be added directly to crude oil or other compositions to be resolved. As such, the demulsifier composition includes an anhydride alone or in combination with other demulsifiers. The anhydride especially acetic anhydride, can be used in an amount ranging between trace (which is around 0.5% or less by weight) and 100% by weight of the demulsifier composition.

This invention further relates to a demulsifier composition formed from a blend of demulsifier and the anhydride. The demulsifier includes ionic and non-ionic surfactants. Specific demulsifiers for use in the composition include alkylphenol resin, alkoxylates and derivatives, polyglycol ethers and derivatives, amine alkoxylates and derivatives, polyamine alkoxylates and derivatives, and combinations thereof. The demulsifier composition includes acetic anhydride in an amount ranging between about 1% and about 99% by weight of the composition. More preferably, the acetic anhydride is added in an amount ranging between about 20% and about 80% by weight of the demulsifier composition. Even more preferably, the acetic anhydride is added in an amount ranging between about 30% and about 60% by weight of the demulsifier composition. As such, the anhydride can be used alone, so that the ultimate demulsifier composition contains an amount of the anhydride equal to between a trace amount and up to 100% by weight of the demulsifier composition.

The invention also includes the use of anhydrides, especially acetic anhydride, as a solvent. Also, the invention includes using the anhydride blended alone or with a demulsifier to form a demulsifier composition in which the anhydride functions as a solvent. As such, any amount of anhydride can be used as a solvent.

The invention further includes a method of forming a demulsifier composition. This includes adding at ambient conditions an amount of anhydride to a known demulsifier.

Finally, the invention includes a method for dehydrating crude oil, whereby an amount of the demulsifier composition is added to the crude oil. The demulsifier composition includes an anhydride, such as acetic anhydride, and potentially other constituents. The resultant demulsifier composition remains fluid at sub-zero temperatures including down to 40° C. below zero and lower.

Additional features and advantages are described herein, and will be apparent from, the following Detailed Description and Examples.

DETAILED DESCRIPTION

The term "demulsifier" as used herein refers to a class of chemicals used to aid the separation of emulsions (including water in oil, oil in water, and multiple emulsions). They are commonly used in the processing of crude oil, which is typically produced along with significant quantities of saline water. This water (and salt) must be removed from the crude oil prior to refining, otherwise significant corrosion problems can occur in the refining process. Demulsifiers are typically based on the following chemistry: acid catalysed phenol-formaldehyde resins, base catalysed phenol-formaldehyde resins, polyamines, di-epoxides, polyols. The above are usually ethoxylated (and/or propoxylated) to provide the desired degree of water/oil solubility. The addition of ethylene oxide increases water solubility, whereas propylene oxide decreases it. Commercially available demulsifier formulations are typically a mixture of two to four different chemistries in a carrier solvent(s), such as xylene, heavy aromatic naptha, isopropyl alcohol, MeOH.

The term "acetic anhydride" as used herein refers to acetyl oxide or acetic oxide of the formula $(CH_3CO)_2O$. The acetic anhydride is a colorless, mobile, strongly refractive liquid. It is miscible with alcohol, ether, and acetic acid; and decomposes in water to form acetic acid.

The present invention relates to a demulsifier composition that includes anhydride and can include an amount of a known demulsifier. Suitable anhydrides include alkyl and aryl anhydrides, acetic anhydride being preferred. The resultant composition not only functions as a demulsifier, but is also a stable fluid at low temperatures. Specifically, the demulsifier composition functions in cold weather environments of −40° C. and below and reduces the need for inactive solvents. As such, the anhydride demulsifier composition of the present invention is effective for resolving a broad range of hydrocarbon emulsions encountered in crude oil production, refining, and chemical processing. Typical hydrocarbons include crude oil, refined oil, bitumen, condensate, slop oil, distillates, fuels, brines, and mixtures thereof. The demulsifiers are also useful for resolving emulsions in butadiene, styrene, acrylic acid, and other hydrocarbon monomer process streams.

The anhydride offers demulsification performance similar to acids (organic or inorganic) but has an appreciable solubility for conventional demulsifier active ingredients. For example, acetic anhydride has a freezing point of −73° C., making it versatile not only as an active ingredient but also as a winterizing solvent. The acetic anhydride demulsifiers can be used to demulsify water-in-oil emulsions in various production and refinery processes. In a refinery desalting process, the incoming crude is deliberately mixed with wash water to remove dissolved salts and other contaminants. To extract water from the resulting water-in-crude oil emulsion, the emulsion is admixed with an effective amount of the acetic anhydride demulsifiers. In the process of resolving crude petroleum oil emulsions of the water-in-oil type, the demulsifier compositions are brought into contact with or caused to act upon the emulsion to be treated in any of the various methods now generally used in the petroleum industry to resolve or break crude petroleum oil emulsions with a chemical agent.

According to an embodiment, the demulsifier composition comprises at least an anhydride and can also be a blend of at least a "demulsifying amount" of a demulsifier and anhydride, generally acetic anhydride. Demulsifiers, such as ionic or non-ionic surfactants, may be used alone or in combination with any of a number of demulsifiers known in the art including fatty acids, fatty amines, glycols, and alkylphenol formaldehyde condensation products. Typical demulsifiers for breaking crude oil emulsions that may have utility in the compositions herein are described in U.S. Pat. Nos. 2,499,370; 2,557,081; 2,602,053; 3,640,894; 3,699,894; 3,684,735; 4,537,701; and U.K. Patent No. 2,118,937A, all of which are incorporated herein by reference.

Suitable "surfactants" are defined herein to include, but are not necessarily limited to alkylphenol resin such as, oxyalkylated alkyl phenol resins, oxyalkylated amines, glycol resin esters, polyglycol ethers and derivatives, such as bisphenol glycol ethers, bisphenol glycol esters, salts of alkylaryl sulfonic acid, decarbamates, oxyalkylated polyols reacted with compounds selected from the group consisting of diepoxides and polycarboxylic acids, unreacted oxyalkylated polyols, unreacted oxyalkylated phenolic resins, alkoxylates and derivatives, amine alkoxylates and derivatives, polyamine alkoxylates and derivatives, and combinations thereof. The derivatives include post-reacted materials such as polyglycol ether which is often reacted with another polyglycol ether using a linking chemical. Conversely, the polyglycol ether may be reacted with a resin, or any of these compositions may be slightly reacted with, for example, a fatty acid.

In alternative embodiments, the particular demulsifier or solubilizing surfactant used, as well as whether a single demulsfier or a combination of demulsifiers is used, will depend upon the emulsion properties of the produced fluids. The demulsifiers can be added in a variety of amounts including between broadly trace to about 100% or about 1% to about 99% by weight of the composition or between about 10% and about 90% by weight of the composition. More specifically, the demulsifier can be added in an amount equal to between about 20% and about 80% by weight of the composition or, about 40% and about 70% by weight of the demulsifier composition. More preferably, the demulsifier is added in an amount equal to between about 25% and about 50% by weight of the demulsifier composition.

More specifically, the anhydride demulsifier composition ("demulsifier composition") is formed from an amount of anhydride and optionally a known demulsifier, such as the ones mentioned above. The anhydrides include alkyl and aryl anhydrides, specifically proprionic, maleic, and acetic anhydrides, with acetic anhydride being preferred. The anhydride blended with the demulsifier is typically neat, or nearly 100% pure. It can be added in any amount sufficient to produce a demulsification and winterizing solvent. The amount of anhydride mixed with the demulsifier can vary according to a particular use; however, it is generally added in an amount sufficient to prevent freezing of the demulsifier and allow for use in cold climates.

The anhydride, and especially the acetic anhydride, can be added in an amount equal to between trace and up to 100% by weight of the demulsifier composition. If the acetic anhydride is to be used as a principle solvent then it will preferably be added in an amount equal to between about 20% and about 80% by total weight of the demulsifier composition. More preferably the acetic anhydride is added in an amount equal to between about 30% and about 60% by weight of the demulsifier composition. The acetic anhydride can also be added in an amount equal to between about 50% and about 75% by weight of the demulsifier. In an alternative, other solvents may be included with the anhydride whereby it can be added in an amount ranging between about 1% and about 10% by total weight of the demulsifier composition. Again, broadly, the demulsifier composition can include an amount of anhydride, including acetic anhydride, ranging between trace or about 1% and up to about 99% or 100% by weight of the demulsifier composition.

The demulsifier composition may also include corrosion inhibitors, viscosity reducers and other chemical treatments used in crude oil production, refining and chemical processing. Additional optional solvents could be added such as: xylene, toluene, light or heavy aromatic naphtha, and the like. Each component contributes to different treating characteristics when added to the crude oil emulsion due to their unique chemical properties.

In a typical application, the acetic anhydride alone or with a demulsifier is blended together to form a chemical treatment suitable for application to the emulsion. The amount of the demulsifier composition used depends on the particular crude oil emulsion being treated. Although the amount added is typically at least 10 ppm. In general, the effective amount of demulsifier composition ranges from between about 10 ppm to about 1,000 ppm based on the volume of oil. For example, the demulsifier composition can be introduced into the crude oil emulsion by injecting beneath the surface into the oil well itself by injecting into the crude oil at the well-head or by injecting into the crude oil process stream at a point between and including the well-head and the final oil storage tank. The demulsifier composition may be injected continuously or in batch fashion. The injection step is preferably accomplished using electric or gas pumps.

The treated crude oil emulsion is then allowed to separate into distinct layers of water and oil. Once separation into distinct layers of water and oil has been effected, various means known in the art can be utilized for withdrawing the free water and separating crude oil.

In a typical process for demulsification of crude oil, a reservoir is provided to hold the composition of the invention in either diluted or undiluted form adjacent to the point where the effluent crude petroleum oil leaves the well. For convenience, the reservoir is connected to a proportioning pump capable of dropwise injecting the demulsifier of the invention into the fluids leaving the well, which then pass through a flow line into a settling tank. Generally, the well fluids pass into the settling tank at the bottom of the tank so that incoming fluids do not disturb stratification of the layers of crude petroleum oil and water that takes place during the course of demulsification.

The foregoing may be better understood by reference to the following examples, which are intended for illustrative purposes and are not intended to limit the scope of the invention.

EXAMPLE 1

Listed below are a variety of compositions that were tested as demulsifiers. The testing was performed as a typical bottle test where 100 ml of warmed oil emulsion was contacted for a period of time with a demulsifier. The oil contained water in an amount equal to 15% by volume of the total mixture. The emulsions were heated to about 80° C. The demulsifiers were added as listed below in an amount ranging between about 300 ppm to about 2400 ppm. The emulsion and demulsifier mix was shaken.

| Chemical | Dose/ppm | Water drop/ml (monitored over time) | | | | Residual water in oil/% |
|---|---|---|---|---|---|---|
| | | 15' | 25' | 1 h | 2 h | |
| D-88 + D-87 | 300 + 300 | 0 | 0 | 1 | 3 | 11.5 |
| | 600 + 600 | 0 | 1 | 8 | 14 | 2.4 |

-continued

| Chemical | Dose/ppm | Water drop/ml (monitored over time) | | | | Residual water in oil/% |
|---|---|---|---|---|---|---|
| | | 15' | 25' | 1 h | 2 h | |
| | 900 + 900 | 0 | 1 | 10 | 14 | 2.1 |
| | 1200 + 1200 | 2 | 4 | 13 | 15 | 1.3 |
| 215.1 | 300 | 2 | 4 | 13 | 15 | 1.2 |
| | 600 | 5 | 9 | 12 | 15 | 1.2 |
| | 900 | 6 | 10 | 13 | 15 | 1.1 |
| | 1200 | 8 | 11 | 13 | 13 | 0.8 |

Performance of the chemical treatment was evaluated by means of monitoring the volume of water that phase separated in the bottle over time (15 minutes, 25 minutes, 1 hour, and 2 hours) and also by determining the amount of residual water (percentage by volume) that remained in the oil at the end of the 2 hour period (far right column).

The two formulations D-87 and D-88 were designed to treat an oilfield emulsion in Northern Alberta. The demulsifier and acid blends were both required to dehydrate the crude oil. Neither is capable of treatment on its own and treatment rates of both are high. D-88 is a conventional demulsifier blend comprising about 40% active ingredients (polymeric alkoxylates and derivatives) and about 60% inactive solvent (alcohol and aromatic hydrocarbon). D-87 is a 50% active solution of acetic acid in xylene and isopropyl alcohol. These solvents are required to prevent the acetic acid from freezing (it has a melting point of 16° C.).

Blend 215.1 is a novel blend comprising demulsifier active ingredients from D-88 (25%) and acetic anhydride (75%). The laboratory test data shows that at 300 ppm this single blend performs equivalently to 1200 ppm D-88 plus 1200 ppm D-87.

EXAMPLE 2

Acetic anhydride is used as a demulsifier. Tests are performed whereby a typical bottle test of 100 ml of warmed oil emulsion is contacted for a period of time with the acetic anhydride demulsifier. The oil contains water in an amount equal to 15% by volume of the total mixture. The emulsions are heated to 80° C. The acetic anhydride is then added in an amount ranging between 300 ppm and 2400 ppm. The emulsion and demulsifier mix is shaken.

Performance of the chemical treatment is evaluated by means of monitoring the volume of water that phase separates in the bottle over time (15 minutes, 25 minutes, 1 hour, and 2 hours) and also by determining the amount of residual water (percentage by volume) that remains in the oil at the end of the 2 hour period. The results will show that water is separated, and the residual water is less than 1.2%.

While the invention has been explained in relation to exemplary embodiments, it is to be understood that various modifications thereof will become apparent to those skilled in the art upon reading the description. Therefore, it is to be understood that the invention disclosed herein is intended to cover such modifications as fall within the scope of the appended claims.

The claimed invention is:
1. A method of demulsifying an oil and water emulsion, wherein the oil is a crude oil, the method comprising:
   a) forming a demulsifier composition including an anhydride in an amount ranging between about 25% and about 50% by weight of the demulsifier composition, wherein the demulsifier composition remains fluid at temperatures down to about 40° C. below zero and lower, and wherein the demulsifier composition further comprises a component selected from the group consisting of: alkylphenol resins; alkoxylates and derivatives; polyglycol ethers and derivatives; amine alkoxylates and derivatives; polyamine alkoxylates and derivatives; oxyalkylated amines; glycol resin esters; salts of alkylaryl sulfonic acid; dicarbamates; oxyalkylated polyols reacted with diepoxides and polycarboxylic acids; unreacted oxyalkylated polyols; unreacted oxyalkylated phenolic resins; alkoxylates and derivatives; and combinations thereof;

b) injecting the demulsifier composition beneath a surface into an oil well; and c) separating the oil from the water.

2. The method of claim 1, wherein the demulsifier composition further comprises additional solvents.

3. The method of claim 1, whereby the anhydride is selected from the group consisting of: alkyl anhydrides and aryl anhydrides.

4. The method of claim 1, whereby the anhydride is selected from the group consisting of: propionic anhydride, maleic anhydride, and acetic anhydride.

\* \* \* \* \*